United States Patent
Bi et al.

(10) Patent No.: US 11,911,813 B2
(45) Date of Patent: Feb. 27, 2024

(54) ECOLOGICAL RECONSTRUCTED SPONGE STRUCTURE OF STRIP MINE DUMP AND APPLICATION OF THE SAME

(71) Applicant: China University of Mining and Technology (Beijing), Beijing (CN)

(72) Inventors: Yinli Bi, Beijing (CN); Suping Peng, Beijing (CN)

(73) Assignee: CHINA UNIVERSITY OF MINING AND TECHNOLOGY (BEIJING), Beijing (CN)

( * ) Notice: Subject to any disclaimer, the term of this patent is extended or adjusted under 35 U.S.C. 154(b) by 135 days.

(21) Appl. No.: 17/585,923

(22) Filed: Jan. 27, 2022

(65) Prior Publication Data
US 2022/0251954 A1     Aug. 11, 2022

(30) Foreign Application Priority Data
Feb. 9, 2021   (CN) .......................... 202110178118.3

(51) Int. Cl.
 *B09B 1/00* (2006.01)
 *E21C 41/32* (2006.01)

(52) U.S. Cl.
 CPC .............. *B09B 1/004* (2013.01); *E21C 41/32* (2013.01)

(58) Field of Classification Search
 CPC ................................. B09B 1/004; E21C 41/32
 See application file for complete search history.

(56) References Cited

U.S. PATENT DOCUMENTS

| 5,090,843 A | * | 2/1992 | Grigsby | ................. E02D 31/00 405/129.9 |
| 5,521,132 A | * | 5/1996 | Talmy | ..................... C04B 35/18 588/256 |
| 6,016,714 A | * | 1/2000 | Smith | ..................... E02F 5/145 73/866.5 |

FOREIGN PATENT DOCUMENTS

| CA | 2343617 A1 | * 10/2002 | ............. E21C 41/32 |
| CN | 109854248 A |   6/2019 | |
| CN | 111663624 A | *  9/2020 | ............... A01G 9/02 |

OTHER PUBLICATIONS

First Office Action issued in corresponding Chinese Application No. 202110178118.3; dated Nov. 5, 2021; 15 pgs.
Second Office Action issued in corresponding Chinese Application No. 202110178118.3; dated Jan. 27, 2022; 14 pgs.

* cited by examiner

Primary Examiner — Janine M Kreck
(74) Attorney, Agent, or Firm — HAUPTMAN HAM, LLP

(57) ABSTRACT

An ecological reconstructed sponge structure of a strip mine dump includes a three-layered sponge ecological structure arranged on a groundmass layer of the dump. From bottom to top, the three-layer sponge ecological structure comprises a water-resisting layer, a water-containing layer and a topsoil ecological layer. A thickness of the water-resisting layer is 100~200 cm, a permeability coefficient of the water-resisting layer is 0.35~0.7 m/d, and a degree of compaction is 1200~1400 KPa. A thickness of the water-containing layer is 150~250 cm, a permeability coefficient of the water-containing layer is 10~20 m/d, and a degree of compaction is 800~900 KPa. A thickness of the topsoil ecological layer is 40~60 cm. Soil layer thicknesses and water content may be monitored through a ground penetrating radar.

11 Claims, 1 Drawing Sheet

ECOLOGICAL RECONSTRUCTED SPONGE STRUCTURE OF STRIP MINE DUMP AND APPLICATION OF THE SAME

RELATED APPLICATIONS

The present application claims priority from Chinese Application Number 202110178118.3, filed Feb. 9, 2021, the disclosure of which is hereby incorporated by reference herein in its entirety.

FIELD OF THE INVENTION

The present disclosure relates to an ecological reconstructed sponge structure of a strip mine dump and an application of the ecological reconstructed sponge structure, which belongs to the technical field of land reclamation and ecological reconstruction.

BACKGROUND OF THE INVENTION

A large-scale strip mine dump is an artificial giant accumulated body of loose rock and soil, in which "platform—side slope" is a basic landform unit, rock and soil of a platform is compacted tightly by large-scale machinery, while freely piled-up rock and soil of a side slope is loosened (FIG. 1). On the one hand, a newly built dump has obvious uneven sedimentation, many cracks and subsided pits, and low vegetation coverage. Its water erosion characteristics are significantly different from that of the original landform in following three specific aspects: ① hard surface layer of the platform where covering soil is compacted by a roller and loose rock and soil of the steep slope collectively create conditions for severe water erosion; ② a slope length of 50~80 m causes dense rill erosion on surface of the slope; ③ the uneven sedimentation and cracks cause runoff collection paths to have a characteristic of large temporal and spatial variation. On the other hand, in opencast mining, in order to be efficient and accommodate more rock and soil waste, mechanical transportation and compaction are often applied to increase a capacity of the dump, but an effect of layered structure and physical properties of covering soil on an ecological layout pattern is often overlooked. Therefore, an effective and feasible construction of a sponge-model soil layer structure with a high water-containing rate is a fundamental for land reclamation and vegetation restoration of large-scale dumps in semi-arid loess areas.

SUMMARY OF THE INVENTION

An objective of the present disclosure is to provide an ecological reconstructed sponge structure of a strip mine dump. The ecological reconstructed sponge structure of the present disclosure is used in combination with confluence engineering design of the dump, so that water in the dump can be fully preserved and effectively utilized so as to significantly improve ecological reconstruction effect of a strip coal mine.

The ecological reconstructed sponge structure of a strip mine dump provided by the present disclosure is a three-layered sponge ecological structure arranged on a ground-mass layer of the dump;

The three-layered sponge ecological structure includes, from bottom to top, a water-resisting layer, a water-containing layer, and a topsoil ecological layer.

In the above-mentioned ecological reconstructed sponge structure, a thickness of the water-resisting layer may be 100~200 cm;

The water-resisting layer is formed of sand and gravel, soil, and fly ash that have been subjected to compaction;

A permeability coefficient of the water-resisting layer may be 0.35~0.7 m/d, and a degree of compaction may be 1200~1400 KPa.

The fly ash is available from a coal fired power plant;

The fly ash is spherical in shape, content of the fly ash having a diameter in a range of 17~40 μm is more than 85% t, an average particle size thereof is about 30 μm, and main constituents of the fly ash are silicon dioxide, aluminum oxide, ferric oxide, and calcium oxide.

In the above-mentioned ecological reconstructed sponge structure, a thickness of the water-containing layer may be 150~250 cm, preferably about 2 m;

The water-containing layer may be formed of sand, soil and fly ash that have been subjected to compaction;

A permeability coefficient of the water-containing layer may be 10~20 m/d, and a degree of compaction may be 800~900 KPa.

The sand and gravel, the sand and the soil are all acquired from layered stripped groundmass that is mined at the strip coal mine.

In the above-mentioned ecological reconstructed sponge structure, a thickness of the topsoil ecological layer may be 40~60 cm;

The topsoil ecological layer refers to a layer of surface soil that is stripped before mining of a mine area or a layer of surface soil that is artificially added with a certain organic matter, and the topsoil ecological layer is suitable for vegetation growth.

The water-containing layer of the ecological reconstructed sponge structure of the present disclosure is a layer where water can be dynamically accumulated and water content can be maintained. When there is much surface water, the water will infiltrate and remain at this layer, while when there is little surface water, root system will root downward to this layer to absorb and transfer the water. A thickness of the topsoil ecological layer in the present disclosure is 40~60 cm, which facilitates the root system to root downward to the water-containing layer to obtain water. Therefore, the water-containing layer in the ecological reconstructed structure of the present disclosure has a capability and characteristic of buffering and retaining water, which refers to not only a water-bearing effect, but also a capability of ecological water conservation.

With respect to the structural configuration of the ecological reconstructed sponge structure of the present disclosure. i.e., the topsoil ecological layer of 40~60 cm, the water-containing layer of 150~250 cm (the permeability coefficient is 10~20 m/d, the degree of compaction is 800~900 KPa), and the water-resisting layer of 100~200 cm (the permeability coefficient is 0.35~0.7 m/d, the degree of compaction is 1200~1400 KPa), a ground penetrating radar may be adopted to monitor thicknesses and moisture content of these different soil layers so that the soil layer structure can better meet ecological application.

The ecological reconstructed sponge structure of the present disclosure has a better long-term effect on growth of vegetation and reproduction of species, promotes growth of species and stability of an ecosystem, and enables vegetation diversity, richness and biomass of the dump to all reach a good level.

The ecological reconstructed sponge structure of the present disclosure is used in combination with confluence engineering design of the dump, so that water in the dump can be fully preserved and effectively utilized so as to significantly improve ecological reconstruction effect of the strip coal mine.

DETAILED DESCRIPTION OF THE EMBODIMENTS

The experimental approaches used in the following embodiments are all routine methods unless otherwise specified herein.

The materials, reagents and the like used in the following embodiments are all available commercially unless otherwise specified herein.

At present, reclamation of a dump mainly relies on large-scale mining reclamation machinery to carry and level soil and rock, so that the "man-made site" is restored to a more applicable topography. In order to ensure safety of the opencast dump and accommodate more soil and rock materials, a strict compaction method using machinery is often used, which makes ecological restoration of the strip mine dump in arid and semi-arid areas extremely difficult. As such, the present disclosure provides a three-layered sponge ecological structure to improve effect of ecological reconstruction of a strip mine.

Embodiment 1. Three-Layered Sponge Ecological Structure

Figure 1:
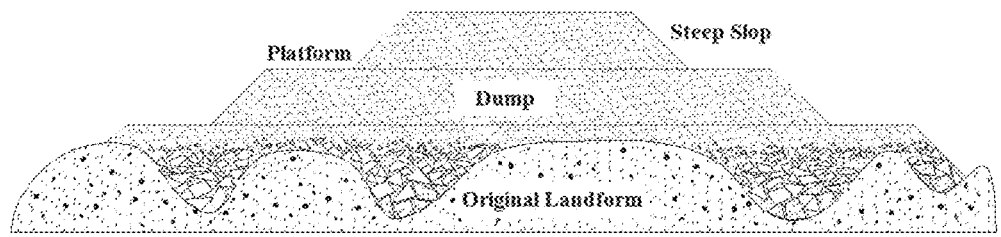
FIG. 1 is a schematic diagram of a structure of a dump outside an existing large-scale strip coal mine.
Figure 2:
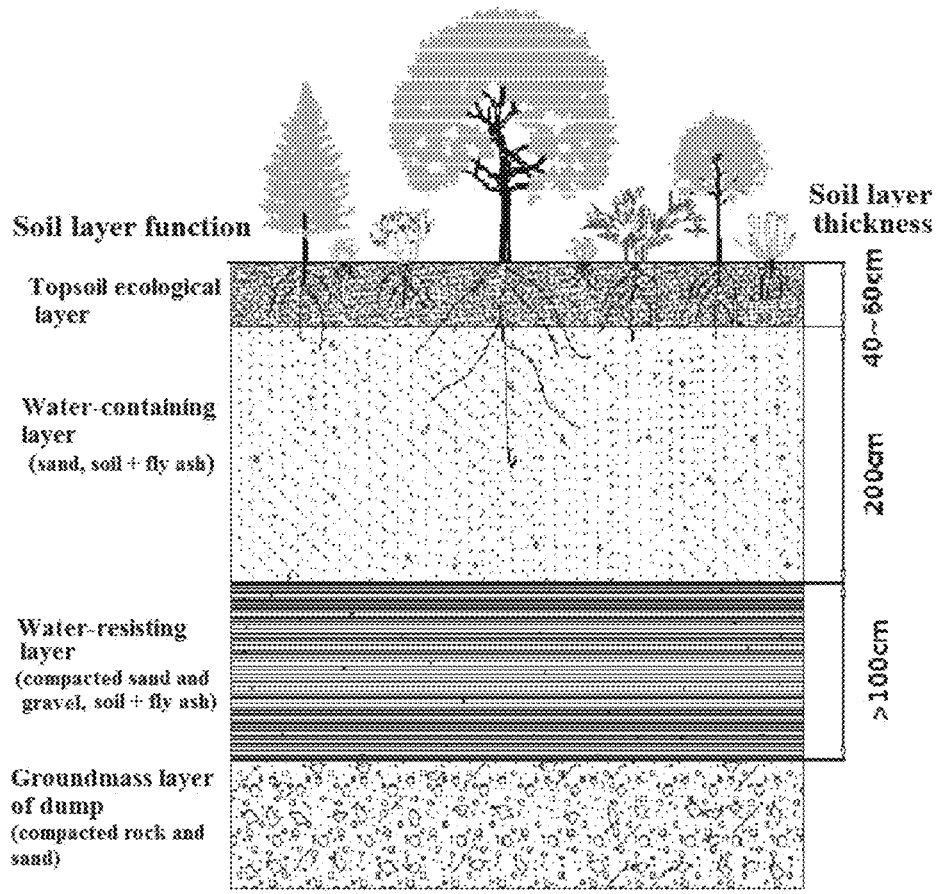
FIG. 2 is a schematic diagram of a three-layered sponge ecological structure of the present disclosure.

As shown in FIG. 1, it is a schematic diagram of a three-layered sponge ecological structure of the present disclosure. After a large-scale soil and rock compaction project (i.e., a groundmass layer of a dump), a layer of 1 m thick (specifically, may be between 1 m and 2 m) water-resisting layer is paved, which is composed of sand and gravel, soil, and fly ash that have been subjected to tight compaction, and has a permeability coefficient of 0.5 m/d and a degree of compaction of 1300 KPa; a layer of about 2 m thick water-containing layer is paved then, which is composed of sand, soil, and fly ash that have been subjected to tight compaction, and has a permeability coefficient of 15 m/d and a degree of compaction of 850 KPa; and a topsoil ecological layer of 40~60 cm is paved at the uppermost layer, that is, a three-layered sponge ecological structure has been constructed.

The fly ash used in the present disclosure is spherical in shape. Content of the fly ash having a diameter in a range of 17~40 μm is more than 85%. An average particle diameter thereof is about 30 μm. Main constituents of the fly ash are silicon dioxide, aluminum oxide, ferric oxide, and calcium oxide.

The sand and gravel, sand, and soil used in the present disclosure are all acquired from layered stripped groundmass that is mined in the strip coal mine.

The topsoil ecological layer used in the present disclosure is a layer of surface soil that is stripped before mining of a mine area, and the topsoil ecological layer is suitable for vegetation growth.

The water-containing layer in the ecological reconstructed sponge structure of the present disclosure is a layer where water can dynamically accumulate and water content can be maintained. When there is much surface water, the water will infiltrate and remain at this layer, while when there is little surface water, root system will root downward to this layer to absorb and transfer the water. A thickness of the topsoil ecological layer in the present disclosure is 40~60 cm, which facilitates the root system to root downward to the water-containing layer to obtain water. Therefore, the water-containing layer in the ecological reconstructed structure of the present disclosure has a capability and characteristic of buffering and retaining water, which refers to not only a water-bearing effect, but also a capability of ecological water conservation.

With respect to the configuration of the ecological reconstructed sponge structure of the present disclosure, a ground penetrating radar may be adopted to monitor thicknesses and moisture content of these different soil layers so that the soil layer structure can better meet ecological application.

Embodiment 2. Application Effect of Three-Layered Sponge Ecological Structure

Plants (Chinese pine, Prunus armeniaca, Sea buckthorn, and Awnless brome) are planted, respectively, on the structure of the three-layered sponge ecological structure of the present disclosure and a structure which covers a topsoil ecological layer of 50 cm at the upper (that is, no water-containing layer or water-resisting layer is provided in the structure). Plant growth and water content change in the two structures are investigated.

The lowest layers of the both structures are a structure stacked alternately by rocks and sand.

(1) Differences in Community Characteristics

Table 1 shows analysis results of vegetation characteristics of the vegetation planted under the same reclamation years at the three-layered sponge ecological structure of the present disclosure and at a dump structureless beneath topsoil, respectively.

TABLE 1

Comparison of growth of covering plant of dumps with similar topsoil layers but with different soil layer structures

| | Sponge structure (50 cm topsoil covered at the upper, and a 2 m water-containing layer and a 1 m water-resisting layer at the lower), and a structure stacked alternately by rock and sand | | 50 cm topsoil covered at the upper, and no layer at the lower (i.e., no water containing layer or water-resisting layer), and a structure stacked alternately by rock and sand | |
|---|---|---|---|---|
| Reclamation years | 7 yeas | 10 yeas | 7 yeas | 10 yeas |
| Richness | 8.6 (±2.1) [c] | 11.3 (±2.7) [d] | 4.1 (±1.7) [a] | 7.9 (±1.2) [b] |
| SWI | 3.1 (±0.8) [c] | 5.6 (±1.7) [d] | 2.5 (±1.1) [a] | 2.8 (±1.6) [b] |
| Aboveground biomass (g/m$^2$) | 87.5 (±24.7) [c] | 114.3 (±27.6) [d] | 43.7 (±14.3) [a] | 72.1 (±24.7) [b] |

It can be seen from the data in Table 1 that growth of vegetation at different sponge structures shows differences in that: overall growth of vegetation at the dump structure-less beneath the topsoil is worse than that of the sponge structure, i.e., the vegetation is sparse and there are fewer species; a vegetation growth reclaimed over 10 years at the topsoil layer structureless beneath cannot even reach a vegetation growth reclaimed over 7 years at the sponge ecological structure of the present disclosure.

Therefore, it can be seen that the soil layer of the sponge ecological structure of the present disclosure has a better long-term effect on growth of vegetation and reproduction of species, and promotes growth of species and stability of an ecosystem.

(2) Changes of Water Content in Soil Layers

July to September in Northwestern China is a season that annual rainfall concentrates, more than 70% of the rainfall is concentrated in this season, and most of them are heavy rainstorm. After one week of continuous rainfall in September, water content of these soil layers are monitored, and water content of the different layers are vaned. After the rain stops and the sun come out, the temperature rises rapidly so that the evaporation increases, as shown in Table 2.

(3) Water Retention Effect

Comparing with the piled-up structure-less soil layer, the sponge ecological structure (40~60 cm topsoil covered at the upper, and a 2 m water-containing layer and a 1 m water-resisting layer at the lower) is adopted so that water evaporation in an ecological reconstruction area that plants trees+shrubs combination is reduced by about 17~38%, air relative humidity is increased by 10%~30%, and ineffective crop transpiration is reduced by 22%~37%. Ecological reconstruction of a strip coal mine where the sponge structure is adopted has effectively regulated the microclimate in the mining area, soil erosion quantity is reduced, and runoff quantity is decreased. Different vegetation configurations, such as trees, shrubs and grass (Chinese pine, Prunus armeniaca, and Awnless brome), shrubs and grass (Sea buckthorn, Awnless brome), and grass (Awnless brome) planted at the sponge soil structure all grow well, and through reclamation of 7 years, their vegetation coverage reaches 100%, 80%, 60%, respectively. Average soil erosion quantity of bare land (vegetation coverage is less than 10%) is respectively 1.806, 3.027, 4.923, 11.77, 46.667 times of land having 20%, 40%, 60%, 80%, 100% vegetation coverage, that is, vegetation reconstruction has greatly reduced soil and water loss. When the vegetation coverage reaches 60~80%, average quantity of soil and water loss is 258.137~628.087 t/km$^2$·a, which belongs to mild erosion and basically eliminates the harm of soil and water loss. Thus, it can be seen that the sponge structure of the present disclosure has good ecological significance in regulation of water conservation and storage, ecological utilization, and reduction of soil and water loss.

TABLE 2

Changes of soil water content (i.e., water retention capacity) of dumps with similar topsoil layers but with different soil layer structures

| | Sponge structure (40-60 cm topsoil covered at the upper, and a 2 m water-containing layer and a 1 m water-resisting layer at the lower), and a 4 m lower structure stacked alternately by rock and sand | | 40-60 cm topsoil covered at the upper, and no layer at the lower (i.e., no water containing layer or water-resisting layer), and a structure stacked alternately by rock and sand | |
|---|---|---|---|---|
| | After rain | One week after rain | After rain | One week after rain |
| Topsoil layer | 14% | 11% | 14% | 11% |
| Water-containing layer | 82% | 79% | 75% | 72% |
| Water-resisting layer | 74% | 77% | | |

The invention claimed is:

1. An ecological reconstructed sponge structure of a strip mine dump, which is a three-layered sponge ecological structure arranged on a groundmass layer of the dump;
   the three-layered sponge ecological structure comprises, from bottom to top,
   a water-resisting layer,
   a water-containing layer, and
   a topsoil ecological layer;
   wherein
   a thickness of the water-resisting layer is 100-200 cm,
   a thickness of the water-containing layer is 150-250 cm,
   the water-containing layer comprises a mixture of sand, soil, and fly ash that has been subjected to a degree of compaction,
   the degree of compaction is 800-900 kPa, and
   a permeability coefficient of the water-containing layer is 10-20 m/d.

2. The ecological reconstructed sponge structure according to claim 1, wherein the water-resisting layer is formed of sand and gravel, soil, and fly ash that have been subjected to compaction.

3. The ecological reconstructed sponge structure according to claim 2, wherein a permeability coefficient of the water-resisting layer is 0.35-0.7 m/d, and a degree of compaction is 1200-1400 kPa.

4. The ecological reconstructed sponge structure according to claim 1, wherein a thickness of the topsoil ecological layer is 40-60 cm.

5. The ecological reconstructed sponge structure according to claim 4, wherein the topsoil ecological layer refers to a layer of surface soil that is stripped before mining of a mine area or a layer of surface soil that is added with a certain organic matter.

6. A method of land reclamation and vegetation reconstruction in the strip mine dump, comprising:
   combining an ecological reconstructed sponge structure with a ground penetrating radar to monitor thicknesses and moisture content of soil layers;
   wherein, the ecological reconstructed sponge structure of a strip mine dump is a three-layered sponge ecological structure arranged on a groundmass layer of the dump, and the three-layered sponge ecological structure comprises, from bottom to top, a water-resisting layer, a water-containing layer, and a topsoil ecological layer;
   wherein
   a thickness of the water-resisting layer is 100-200 cm,
   a thickness of the water-containing layer is 150-250 cm,
   the water-containing layer comprises a mixture of sand, soil, and fly ash that has been subjected to a degree of compaction,
   the degree of compaction is 800-900 kPa, and
   a permeability coefficient of the water-containing layer is 10-20 m/d.

7. The method according to claim 6, wherein, the water-resisting layer is formed of sand and gravel, soil, and fly ash that have been subjected to compaction.

8. The method according to claim 7, wherein, a permeability coefficient of the water-resisting layer is 0.35-0.7 m/d, and the degree of compaction is 1200-1400 KPa.

9. The method according to claim 6, wherein, a thickness of the topsoil ecological layer is 40-60 cm.

10. The method according to claim 9, wherein, the topsoil ecological layer refers to a layer of surface soil that is stripped before mining of a mine area or a layer of surface soil that is added with a certain organic matter.

11. A method of land reclamation and vegetation reconstruction in the strip mine dump, comprising:
    constructing an ecological reconstructed sponge structure;
    wherein, the ecological reconstructed sponge structure of a strip mine dump is a three-layered sponge ecological structure arranged on a groundmass layer of the dump, and the three-layered sponge ecological structure consisting of, from bottom to top,
    a water-resisting layer having an initial thickness of 100-200 cm,
    a water-containing layer having an initial thickness of 150-250 cm, having a permeability coefficient of 10-20 m/d, and consisting of a mixture of sand, soil, and fly ash that has been subjected to a degree of compaction of between 800 and 900 kPa,
    and a topsoil ecological layer having an initial thickness; and
    periodically using ground penetrating radar to evaluate the thickness and moisture content of the topsoil ecological layer and the water-containing layer.

* * * * *